(12) United States Patent
Delker et al.

(10) Patent No.: US 8,320,891 B1
(45) Date of Patent: Nov. 27, 2012

(54) TEXT MESSAGES FOR SERVICES

(75) Inventors: Jason R. Delker, Olathe, KS (US); Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 580 days.

(21) Appl. No.: 12/494,033

(22) Filed: Jun. 29, 2009

(51) Int. Cl.
*H04M 3/42* (2006.01)
(52) U.S. Cl. .............. 455/414.3; 455/405; 455/406; 455/408; 455/414.1; 455/466
(58) Field of Classification Search .............. None
See application file for complete search history.

(56) References Cited

U.S. PATENT DOCUMENTS

| | | | |
|---|---|---|---|
| 7,720,494 B2 * | 5/2010 | Ahn | 455/466 |
| 8,005,218 B2 * | 8/2011 | Keeler et al. | 380/249 |
| 8,243,907 B1 | 8/2012 | Gailloux et al. | |
| 2004/0185827 A1 | 9/2004 | Parks | |
| 2006/0276180 A1 * | 12/2006 | Henry | 455/412.2 |
| 2007/0254636 A1 * | 11/2007 | Jiang | 455/414.1 |
| 2009/0069040 A1 * | 3/2009 | Wiesmuller et al. | 455/466 |

OTHER PUBLICATIONS

Pre-Interview Communication dated Dec. 21, 2011, U.S. Appl. No. 12/265,410, filed Nov. 5, 2008.
Notice of Allowance dated Mar. 23, 2012, Application U.S. Appl. No. 12/265,410 filed on Nov. 5, 2009 IDF 6024 (4000-83300).
Supplemental Notice of Allowability dated Jul. 12, 2012, U.S. Appl. No. 12/265,410 filed on Nov. 5, 2008.

* cited by examiner

*Primary Examiner* — Willie J Daniel, Jr.

(57) ABSTRACT

Systems and methods provide text messages for services. A service component provides service options to a handset's user interface, receives a service option selection, and provides a first text message to a server based on the selection. The service component receives a second text message from the server in response to the first text message and provides the second text message to the user interface. The service component may provide interactive voice response system service options to the user interface if an entered number is associated with a specified service. The service component may provide and receive text messages as short message service messages via a handset wireless paging channel. The service component may provide short message service messages to the user interface via an interactive voice response system message. The second text message may include a prompt for a request to occasionally receive the second text message.

18 Claims, 5 Drawing Sheets

TEXT MESSAGES FOR SERVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A handset may be a mobile phone, a wireless handset, a pager, a personal digital assistant, a gaming device, an inventory control device, a media player, a digital camera, a digital calculator, a telephone, a wireless communication device, a pager, a portable computer, a digital music player, or an electronic key fob for keyless entry. A handset user may use a handset to call and request various services from a customer care representative at a customer care center for a service provider. Examples of service providers include a communication service provider, a bank, a credit card provider, a weather forecaster, and a medical facility. Some service providers use an interactive voice response (IVR) in addition to or in place of customer care representatives at a customer care center. IVR is a technology that allows a computer to detect voice and keypad inputs. IVR systems can respond with pre-recorded or dynamically generated audio to further direct users on how to proceed. IVR systems can be used to control almost any function where the interface can be broken down into a series of simple menu choices. Answers to simple questions such as account balances or pre-recorded information can be provided without intervention from a customer care representative. Account numbers from the IVR may be compared to caller identification (ID) data for security reasons and additional IVR responses may be required if the caller ID data does not match the account record. The caller may be asked to identify themselves by methods such as a personal identification number (PIN) or password.

IVR systems generally scale well to handle large call volumes for customer care centers of communication service providers. IVR systems are typically used to service high call volumes, reduce cost and improve the customer experience.

SUMMARY OF THE INVENTION

In some embodiments, a system is provided for text messages for services. The system includes a service component and a processor on a handset. When executed by the processor, the service component provides service options to a user interface on the handset, receives a selection of at least one of the service options, and provides a first text message to a server based on the selection. The service component also receives a second text message from the server in response to the first text message and provides the second text message to the user interface.

In some embodiments, a method is provided for text messages for services. Service options are presented on a handset. A selection is received of at least one of the service options. A first text message is provided to a server based on the selection. A second text message is received from the server in response to the first text message. The second text message is presented on the handset.

In some embodiments, a system is provided for text messages for services. The system includes a service component and a processor on a handset. When executed by the processor, the service component intercepts a connection request associated with an entered number. If the entered number is associated with a specified service, the service component provides interactive voice response system service options to a user interface on the handset and receives a selection of at least one of the interactive voice response system service options. The service component provides a first short message service message via a handset wireless paging channel to a server based on the selection, and receives a second short message service message via the handset wireless paging channel from the server in response to the first short message service message. The service component provides the second short message service message to the user interface as an interactive voice response system message, wherein the second short message service message includes a prompt for a request to receive content of the second short message service message on an occasional basis.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A service provider may provide the services of customer care representatives and/or an interactive voice response (IVR) without charge. Furthermore, a communication service provider may not charge their customers for the voice calls from their customers' handsets to the communication service provider's customer care centers. A service provider may reduce its own expenses by providing efficient customer care that minimizes the amount of time that handsets are communicating with their customer care centers, which may also increase customer satisfaction.

Systems and methods are provided for text messages for services. A service component on a handset provides service options to a user interface and receives a selection of at least one of the service options. Instead of enabling a voice call to address the selected service option via a customer care representative and/or an IVR, the service component may provide a text message request to a server based on the selection. Providing customer service via text messages may consume considerably less time, effort, and expenses for a service provider than providing customer service via voice calls. The server may receive the request and generates a text message response based on the request. The service component may receive the text message response from the server and provide the text message response to the handset's user interface. If a handset user enters a number to call a customer care center, the service component may intercept the call request and present the service options to the user interface as interactive voice response system service options, such that the handset user may believe the handset is connected to a customer care center via a voice call. Similarly, the service component may provide the text message response as an interactive voice response system message to the user interface. Nearly half of prepaid handset calls to customer care centers may be requests for the minutes remaining on a calling plan. Using text messages for service requests may significantly reduce the expenses incurred for service requests from all types of handsets to the customer care centers by transmitting responses and requests in a less expensive manner. Providing such service options may also increase customer satisfaction. Additionally, the text messages may be sent via alternative channels, such as a push-to-talk network channel or a paging channel, rather than the primary voice channel, which may result in a further reduction of expenses.

Figure 1:
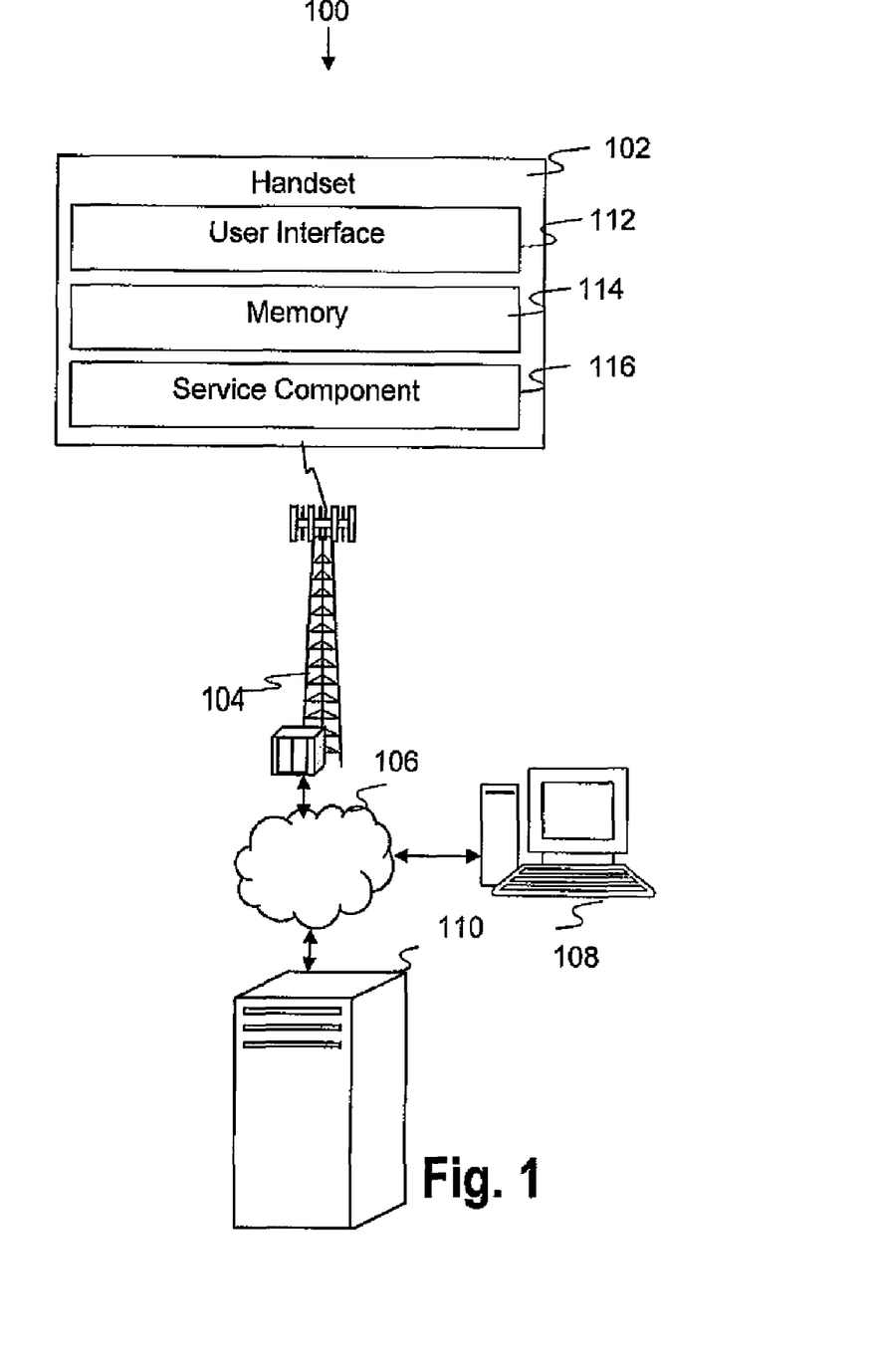
FIG. 1 is a block diagram of a system for text messages for services according to some embodiments of the present disclosure.

FIG. 1 is a block diagram of a system 100 for text messages for services according to an embodiment of the present disclosure. The system 100 includes a handset 102, a base transceiver station (BTS) 104, a network 106, a customer care center 108, and a server 110. The handset 102, which may be a handset that uses a prepaid billing plan, communicates with the BTS 104, which is coupled to the network 106. The network 106 may enable the handset 102 to access the customer care center 108 for assistance with communication services and to access information on various servers, such as the server 110. The server 110 may be associated with the customer care center 108 or with an enterprise that is unrelated to the customer care center 108.

The handset 102 includes a user interface 112, a memory 114, and a service component 116. The user interface 112 presents content to the user of the handset 102. The memory 114 may include service options that are provided by the service component 116 to the user interface 112.

The service component 116 provides service options to the user interface 112 and receives a selection of at least one of the service options. Similar to a contact list for voice calls, the service component 116 may provide a contact list of service options for text messages. For example, the user interface 112 may display an additional button that, when selected, sends a text message to the server 110 to request a service from a communication service provider. If the button is selected and the text "bill" is entered via the user interface 112, the service component may send a request to the server 110 for information related to the most recent bill associated with communication service for the handset 102. If the button is selected and the text "minutes" is entered via the user interface 112, the service component may send a request to the server 110 for information related to the most current amount of prepaid handset minutes remaining on the calling plan for the handset 102. Alternatively, the text message contact list may display a button corresponding to a service option for requesting the most recent bill and another button corresponding to a service option for requesting the most current amount of prepaid handset minutes remaining on a calling plan.

The selection of some service options may enable the bypassing of an option presented by an IVR. Although some of the service options discussed are examples for a communication service provider, the service options may be for other services, such as service options that enable the handset 102 to bypass some options for purchasing tickets to a sporting event offered by a ticket agency's IVR. The selection of some service options listed on the text message contact list also may enable requests for information associated with telephone banking, order placement, credit card providers, weather forecasts, confidential information, test results, and crossword puzzle answers.

Hospitals and clinics may use IVR systems to allow callers to receive anonymous access to test results. This is information that easily could be handled by a customer care representative but an IVR system may be used to preserve privacy and avoid the potential embarrassment of speaking to a person about sensitive information or test results. The selection of some service options may provide text message requests for such sensitive medical information or test results.

Instead of providing a voice call to the customer care center 108 to address the selected service option via a customer care representative and/or an IVR, the service component 116 provides a text message request to the server 110 based on the selection. The service component 116 may determine whether the handset 102 is subscribed to a push-to-talk communication service. If the service component 116 determines that the handset 102 is subscribed to a push-to-talk communication service, the service component 116 may provide the text message request to the server 110 via a push-to-talk network. While a text message request sent via a voice network to the server 110 may be less expensive for a communication service provider than a service request made as a voice call to the customer care center 108, a text message request sent via a push-to-talk network may be even less expensive. Reasons for the reduced expenses of text message requests sent via push-to-talk networks may include the significant loads that text messages may place on voice networks and the relative under-utilization of push-to-talk networks.

The handset 102 may provide push-to-talk communication via one technology network and communicate voice calls via a different technology network. For example, the push-to-talk communication may be via an integrated digital enhanced network (IDEN) communication technology, a code division multiple access (CDMA) technology, or a voice-over Internet Protocol (VoIP) technology. Voice calls may be communicated via a code division multiple access (CDMA) technology, a global system for mobile communication (GSM) technology, a universal mobile telecommunications system (UMTS) technology, or a worldwide interoperability for microwave access (WiMAX) technology. Additionally, the service component 116 may provide the text message request as a short message service (SMS) message via a wireless paging channel. Therefore, a communication service provider may realize additional savings if the service component 116 sends the text message request via an under-utilized IDEN network or a wireless paging channel instead of via a heavily loaded CDMA network. Providing customer service via text messages may consume considerably less time, effort, and expenses for a communication service provider than providing customer service via voice calls. While handset users may speak to a customer care representative for special cases, the reduction in voice call volume may enable customer care representatives to be available for the special cases and may reduce communication time and expenses for both the handset user and the service provider.

The server 110 may receive the text message request, determine a response to the text message request, and send the response as a text message to the service component 116. The service component 116 may present information received in a text message response via the user interface 112, such as displaying information from a text message received in response to a request for the most current amount of prepaid handset minutes remaining on the calling plan. By communicating with the server 110 via text messages, the handset 102 avoids lengthy voice communications by communicating quickly with the server 110. Text messages may minimize the communication time for the system 100, thereby minimizing expenses for the communication service provider. The handset 102 may complete its communication quickly, without the need for a lengthy voice call to a customer care representative at the customer care center 108. The handset 102 may also avoid any delays that occur while the user of the handset 102 makes numerous selections from an IVR to submit the request or while the user explains the request to a customer care representative at the customer care center 108. Providing such service options may significantly reduce the expenses incurred for handset requests to the customer care center 108 by responding to the requests in a less expensive manner, and may increase customer satisfaction.

The service options may include an option to request customer care information, such as the calling plan type for the handset 102, a recent amount of the prepaid handset minutes remaining on the calling plan, the amount of funds recently added to the calling plan, the date when funds were recently added to the calling plan, a recent bill, and the date when the next bill is due. Other service options may include an option to inquire about a bill and an option to communicate with the server 110 in a specific language. The memory 114 may store some selections, such as a requested language, so that when the service options are subsequently displayed on the user interface 112, the stored selection is the default selection.

If a handset user enters a number via the user interface 112 to call the customer care center 108, the service component 116 may intercept the call request and present the service options to the user interface 112 as interactive voice response system service options, such that the handset user may believe the handset 102 is connected to the customer care center 108 via a voice call. The server 110 may provide the interactive voice response system service options to the handset 102 on an occasional basis to maintain the interactive voice response system service options presented on the handset 102 current with the interactive voice response system service options presented by the customer care center 108. Similarly, the service component 116 may provide the text message response as an interactive voice response system message to the user interface 112.

The text message response may include a prompt for a request to occasionally receive content of the text message response. For example, the text message request may be for the remaining prepaid handset minutes, and the text message response may include the remaining prepaid handset minutes and a prompt for a request to receive the remaining prepaid handset minutes each hour. The text message response may embed the prompt in a uniform resource locator (URL). The service component 116 may receive a selection of the request to infrequently receive the content of the text message request and provide a text message to the server 110 based on this selection. For example, the service component 116 sends a text message to the server 110 to indicate selection of the request to receive the remaining prepaid handset minutes each hour. In response, the server 110 may provide the requested content on an occasional basis in a text message to the service component 116, and the service component 116 may receive the content in a text message and store the content in the memory 114. Subsequently, the service component 116 may respond to a selection to request the content from the server 110 by initially providing the content from the memory 114 to the user interface 112, and may indicate the time that the content was received and a service option to request the most current content from the server 110. If the handset user wants more current content than the content stored in the memory 114, the user may select the service option to request the most current content from the server 110.

The server 110 may provide the content to the service component 116 based on information associated with the content. For example, the server 110 may provide the remaining handset minutes when the prepaid service account has less than $10 left, when the service account is established, whenever additional funds are added to the service account, or whenever the service plan is changed for the service account.

The memory 114 may store the content received on an occasional basis, which may be based on current handset usage, current network usage, and/or the frequency with which the handset 102 requests information from the server 110 during a specified time period. For example, the server 110 may send text messages that include the remaining prepaid handset minutes outside of peak calling hours when the handset 102 is not already communicating. If the handset 102 requests information every four hours, the server 110 may update the content every four hours outside of peak hours when the handset 102 is not already communicating.

Figure 2:
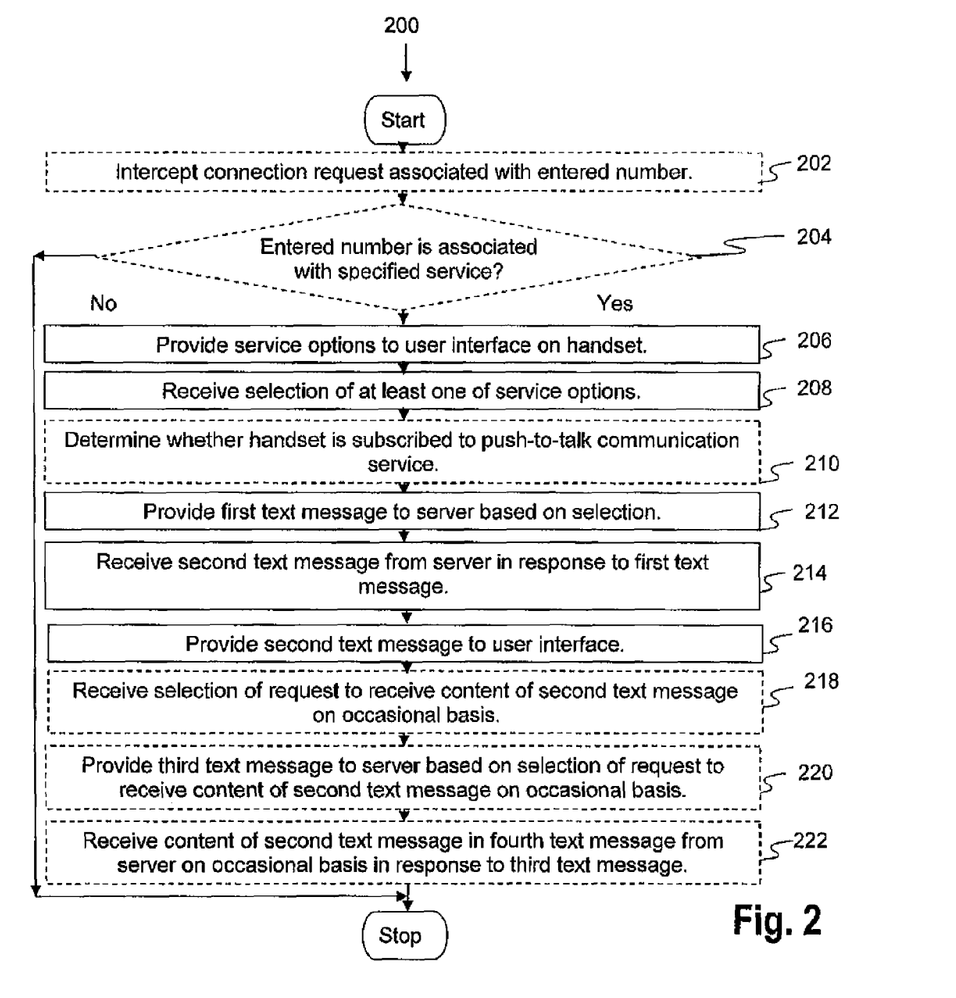
FIG. 2 is a flowchart of a method for text messages for services according to some embodiments of the present disclosure.

FIG. 2 is a flowchart of a method 200 for text messages for services according to some embodiments of the present disclosure. The system 100 can execute the method 200 to display service options, communicate with the server 110 via text messages based on the service options selected, and provide text message responses from the server 110 to the user interface 112.

In box 202, a connection request associated with an entered number is optionally intercepted. For example, the service component 116 intercepts a number entered on the handset 102 to call the customer care center 108.

In box 204, a determination is optionally made whether an entered number is associated with a specified service. For example, the service component 116 determines that the entered number is associated with the customer care center 108. If the entered number is associated with the specified service, the method 200 continues to box 206. If the entered number is not associated with the specified service, the method 200 terminates.

In box 206, service options are provided to the handset user interface. For example, the service component 116 provides the service options to the user interface 112, including the option to request the most current amount of prepaid handset minutes remaining on the calling plan.

In box 208, selection of at least one service option is received. For example, the service component 116 receives a request for the most current amount of prepaid handset minutes remaining on the calling plan.

In box 210, a determination is optionally made whether a handset is subscribed to a push-to-talk communication service. For example, the service component 116 determines whether the handset 102 is subscribed to a push-to-talk communication service.

In box 212, a first text message is provided to a server based on a selection. For example, the handset 102 communicates with the server 110 via a text message based on the selected request. If the handset is subscribed to a push-to-talk communication service, the service component 116 may send the text message to the server 110 via a push-to-talk network.

In box 214, a second text message is received from a server in response to a first text message. For example, the server 110 provides a text message to the service component 116 that indicates the most current amount of minutes remaining on the calling plan. If the service component 116 sent the text message request to the server 110 via a paging channel, the server 110 may send the text message response via the paging channel.

In box 216, a second text message is provided to a user interface. For example, the service component 116 provides the text message response to the user interface 112 to indicate the most current amount of minutes remaining on the calling plan, without communicating with the customer care center 108. The text message response may include a prompt for a request to receive the content of the text message response on occasional basis.

In box 218, a selection of a request to receive content of a second text message on an occasional basis is optionally received. For example, the service component 116 receives a selection of the request to receive the handset minutes remaining on an occasional basis.

In box 220, a third text message is optionally provided to a server based on a selection of a request to receive content of a second text message on an occasional basis. For example, the service component 116 provides a text message to the server 110 based on a selection of a request to receive the handset minutes remaining on an occasional basis.

In box 222, content of a second text message is optionally received in a fourth text message from a server on an occasional basis in response to a third text message. For example, the service component 116 receives the handset minutes remaining in a text message from the server 110 on an occasional basis.

Figure 3:
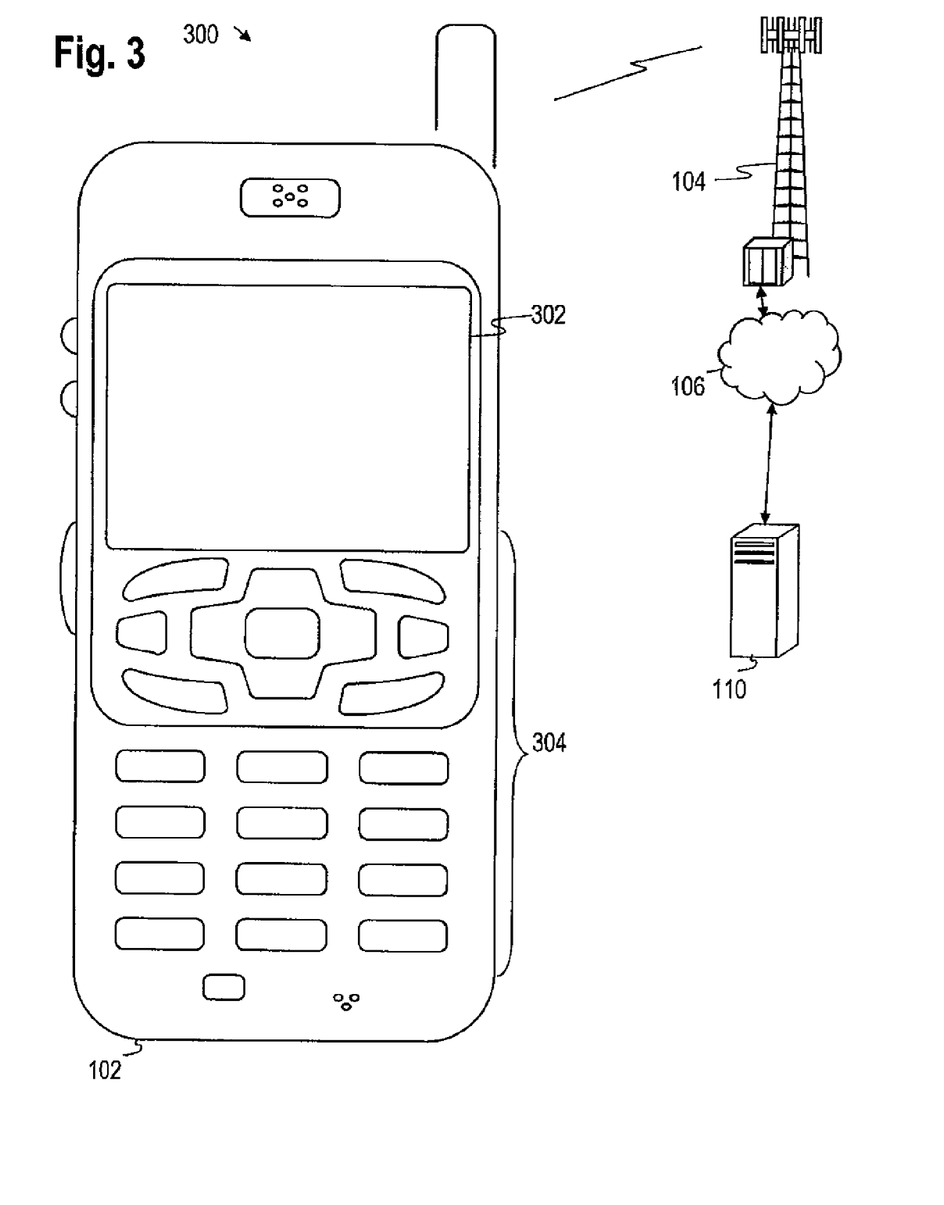
FIG. 3 shows an illustrative wireless communications system according to some embodiments of the present disclosure.

FIG. 3 shows a wireless communications system 300 including the handset 102. FIG. 3 depicts the handset 102, which may be referred to as handset 102, which is operable for implementing aspects of the present disclosure, but the present disclosure should not be limited to these implementations. Though illustrated as a mobile phone, the handset 102 may take various forms including a wireless mobile device, a pager, a personal digital assistant (PDA), a gaming device, an inventory control device, a media player, a digital camera, a digital calculator, a telephone, a wireless communication device, a portable computer, a digital music player, and an electronic key fob for keyless entry. Many suitable handsets 102 combine some or all of these functions. In some embodiments of the present disclosure, the handset 102 is not a general purpose computing device, but rather is a special-purpose communications device such as a mobile phone, wireless mobile device, pager, or FDA. The handset 102 may support specialized activities such as gaming, inventory control, job control, and/or task management functions, and so on.

The handset 102 includes the display 302 and a touch-sensitive surface or keys 304 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset 102. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 302 to show a web page. The web page may be obtained via wireless communications with the BTS 104, a wireless network access node, a peer handset 102 or any other wireless communication network or system. While a single BTS 104 is illustrated, it is understood that the wireless communication system may comprise additional BTS's 104. In some instances, the handset 102 may be in communication with multiple BTS's 104 at the same time. The BTS 104 (or wireless network access node) is coupled to the network 106. Via the wireless link and the network 106, the handset 102 has access to information on various servers, such as the server 110. The server 110 may provide content that may be shown on the display 302. Alternately, the handset 102 may access the BTS 104 through a peer handset 102 acting as an intermediary, in a relay type or hop type of connection.

Figure 4:
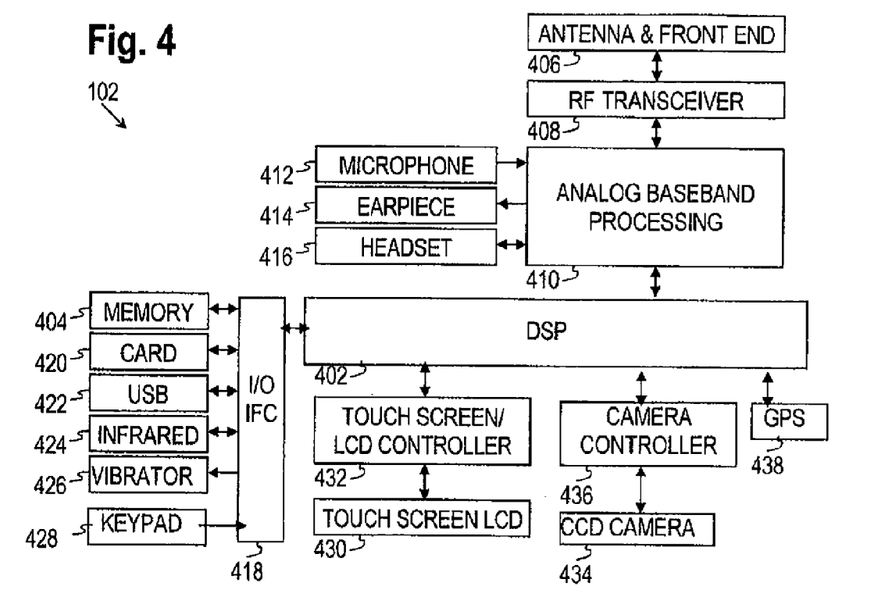
FIG. 4 is a block diagram of an illustrative handset according to some embodiments of the present disclosure.

FIG. 4 is a block diagram of the handset 102. While a variety of known components of the handset 102 are depicted, in an embodiment a subset of the listed components and/or additional components not listed may be included in the handset 102. The handset 102 includes a digital signal processor (DSP) 402 and a memory 404. As shown, the handset 102 may further include an antenna and front end unit 406, a radio frequency (RE) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the handset 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the handset 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 102 to send and receive information from a radio access network (RAN) or some other available wireless communications network or from a peer handset 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the handset 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the handset 102 to function as a peripheral device to exchange information with a personal computer or other computer system. The infrared port 424 and other optional ports such as a Bluetooth interface or an IEEE 802.11 compliant wireless interface may enable the handset 102 to communicate wirelessly with other nearby handsets 102 and/or wireless base stations.

The input/output interface 418 may further connect the DSP 402 to the vibrator 426 that, when triggered, causes the handset 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 102. Another input mechanism may be the touch screen LCD 430, which may also display text and/or graphics to the user. The touch screen LCD controller 432 couples the DSP 402 to the touch screen LCD 430.

The CCD camera 434 enables the handset 102 to take digital pictures. The DSP 402 communicates with the CCD camera 434 via the camera controller 436. The GPS sensor 438 is coupled to the DSP 402 to decode global positioning system signals, thereby enabling the handset 102 to determine its position. In another embodiment, a camera operating according to a technology other than charge coupled device cameras may be employed. Various other peripherals may also be included to provide additional functions, e.g., radio and television reception.

Figure 5:
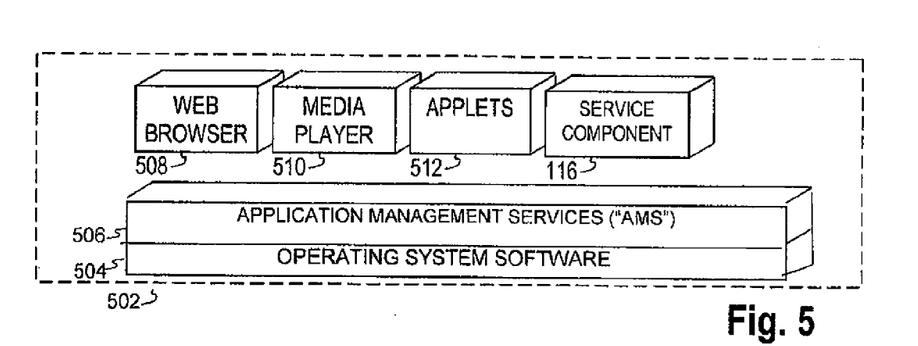
FIG. 5 is a block diagram of an illustrative software configuration for a handset according to some embodiments of the present disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 102. Also shown in FIG. 5 are a web browser application 508, a media player application 510, JAVA applets 512, and the service component 116. The web browser application 508 configures the handset 102 to operate as a web browser, allowing a user to enter information into forms and select links to retrieve and view web pages. The media player application 510 configures the handset 102 to retrieve and play audio or audiovisual media. The JAVA applets 512 configure the handset 102 to provide games, utilities, and other functionality.

Figure 6:
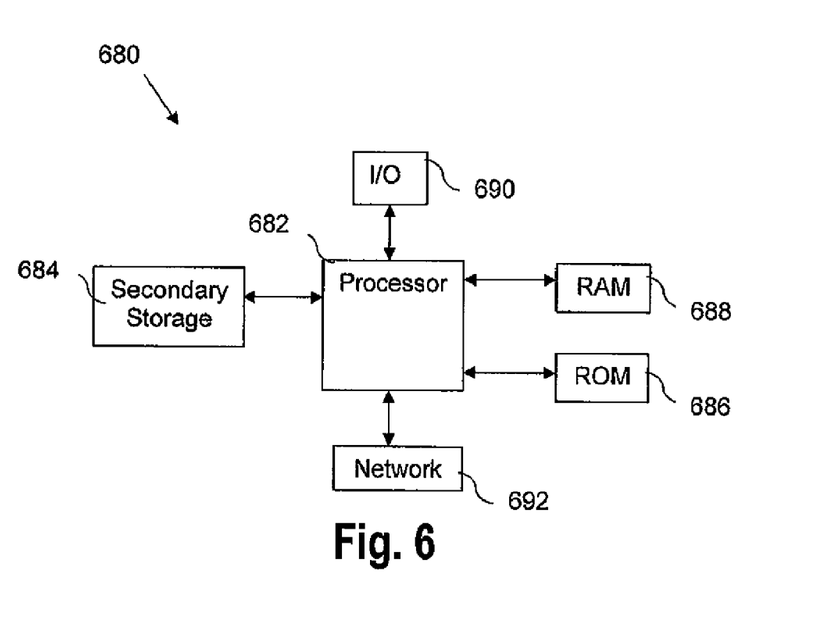
FIG. 6 shows an illustrative computer system suitable for implementing portions of the several embodiments of the present disclosure.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for text messages for services, comprising:
a processor on a handset; and
a service component, when executed by the processor, that
provides service options to a user interface on the handset, wherein each of the service options comprise an option to request information from a server, and wherein the service options comprise a plurality of an option to request prepaid handset minutes currently remaining, an option to inquire about a bill, an option to view prepaid handset minutes remaining at a specified earlier time, an option to view a calling plan type of the handset, an option to view an amount of funds most recently added, an option to view a date when funds were most recently added, and an option to view a date when a next bill is due, receives a selection of at least one of the service options requesting corresponding information from the server, wherein the corresponding information comprises at least one of the prepaid handset minutes currently remaining, information about the bill, the prepaid handset minutes remaining at the specified earlier time, the calling plan type of the handset, the amount of funds most recently added, the date when funds were most recently added, and the date when the next bill is due, provides a first text message to the server requesting the corresponding information based on the selection, receives a second text message comprising the corresponding information from the server in response to the first text message, and provides the second text message to the user interface.

2. The system of claim 1, wherein the handset is one of a mobile phone, a telephone, a wireless communication device, a pager, a personal digital assistant, a portable computer, a digital camera, a digital music player, a digital calculator, an electronic key fob for keyless entry, a media player, and an inventory control device.

3. The system of claim 1, wherein the handset is associated with a prepaid billing plan.

4. The system of claim 1, wherein the service component further:

receives a selection of an other one of the service options, provides a third text message to the server based on the selection of the other one of the service options, receives a fourth text message from the server in response to the third text message, wherein the fourth text message comprises information associated with telephone banking, a credit card provider, weather forecasts, confidential information, test results, or crossword puzzle answers and provides the fourth text message to the user interface.

5. The system of claim 1, further comprising a handset memory to store the service options.

6. A computer implemented method for text messages for services, comprising:

presenting service options on a handset, wherein each of the service options comprise an option to request information from a server, and wherein the service options comprise a plurality of an option to request prepaid handset minutes currently remaining, an option to inquire about a bill, an option to view prepaid handset minutes remaining at a specified earlier time, an option to view a calling plan type of the handset, an option to view an amount of funds most recently added, an option to view a date when funds were most recently added, and an option to view a date when a next bill is due;

receiving a selection of at least one of the service options requesting corresponding information from the server, wherein the corresponding information comprises at least one of the prepaid handset minutes currently remaining, information about the bill, the prepaid handset minutes remaining at the specified earlier time, the calling plan type of the handset, the amount of funds most recently added, the date when funds were most recently added, and the date when the next bill is due;

providing a first text message to the server requesting the corresponding information based on the selection;

receiving a second text message comprising the corresponding information from the server in response to the first text message; and presenting the second text message on the handset.

7. The computer implemented method of claim 6, wherein receiving selection of the at least one of the service options enables the bypassing of an option presented by an interactive voice response system.

8. The computer implemented method of claim 6, wherein at least one of providing the first text message and receiving the second text message comprises communicating a short message service (SMS) message via a handset wireless paging channel.

9. The computer implemented method of claim 6, further comprising determining whether the handset is subscribed to a push-to-talk communication service, wherein providing the first text message comprises communicating via a push-to-talk network in response to a determination that the handset is subscribed to the push-to-talk communication service.

10. The computer implemented method of claim 9, wherein the handset provides push-to-talk communication via a first technology network, a voice call is communicated via a second technology network, and wherein the first technology network and the second technology network comprise different technology networks.

11. The computer implemented method of claim 10, wherein the first technology network communicates via one of an integrated digital enhanced network (IDEN) communication technology, a code division multiple access (CDMA) technology, and a voice-over Internet Protocol (VoIP) technology.

12. The computer implemented method of claim 10, wherein the second technology network communicates via one of a code division multiple access (CDMA) technology, a global system for mobile communication (GSM) technology, a universal mobile telecommunications system (UMTS) technology, and a worldwide interoperability for microwave access (WiMAX) technology.

13. A system for text messages for services, comprising:

a processor on a handset;

a service component, when executed by the processor, that intercepts a connection request associated with an entered number, determines whether the entered number is associated with a specified service, provides interactive voice response system service options to a user interface on the handset in response to a determination that the entered number is associated with the specified service, receives a selection of at least one of the interactive voice response system service options, wherein each of the service options comprise an option to request information from a server, and wherein the service options comprise a plurality of an option to request prepaid handset minutes currently remaining, an option to inquire about a bill, an option to view prepaid handset minutes remaining at a specified earlier time, an option to view a calling plan type of the handset, an option to view an amount of funds most recently added, an option to view a date when funds were most recently added, and an option to view a date when a next bill is due, provides a first short message service message via a handset wireless paging channel to the server requesting corresponding information from the server based on the selection, wherein the corresponding information comprises at least one of the prepaid handset minutes currently remaining, information about the bill, the prepaid handset minutes remaining at the specified earlier time, the calling plan type of the handset, the amount of funds most recently added, the date when funds were most recently added, and the date when the next bill is due, receives a second short message service message comprising the corresponding information via the handset wireless paging channel from the server in response to the first short message service message, and provides the second short message service message to the user interface as an interactive voice response system message, wherein the second short message service message further comprises a prompt for a request to receive content of the second short message service message on an occasional basis.

14. The system of claim 13, wherein the service component further receives a selection of the request to receive content of the second short message service message on the occasional basis, provides a third short message service message via the handset wireless paging channel to a server based on the selection of the request to receive the content of the second short message service message on the occasional basis, and receives the content of the second short message service message in a fourth short message service message via the handset wireless paging channel from the server on the occasional basis in response to the third short message service message.

15. The system of claim 14, further comprising a handset memory to store the fourth short message service message received from the server on the occasional basis.

16. The system of claim 15, wherein the occasional basis is based on at least one of current handset usage and current network usage.

17. The system of claim 15, wherein the occasional basis is based on a frequency with which the handset provides the first short message service message.

18. The system of claim 13, further comprising a handset memory to store the second short message service message.

* * * * *